(12) United States Patent
Yang et al.

(10) Patent No.: US 12,096,426 B2
(45) Date of Patent: Sep. 17, 2024

(54) TERMINAL CAPABILITY REPORTING METHOD, USER TERMINAL AND COMMUNICATION SYSTEM

(71) Applicant: CHINA TELECOM CORPORATION LIMITED, Beijing (CN)

(72) Inventors: Shan Yang, Beijing (CN); Jianchi Zhu, Beijing (CN); Xiaoming She, Beijing (CN); Peng Chen, Beijing (CN); Bo Liu, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 0 days.

(21) Appl. No.: 18/557,500

(22) PCT Filed: Dec. 9, 2021

(86) PCT No.: PCT/CN2021/136748
§ 371 (c)(1),
(2) Date: Oct. 26, 2023

(87) PCT Pub. No.: WO2022/227588
PCT Pub. Date: Nov. 3, 2022

(65) Prior Publication Data
US 2024/0224267 A1    Jul. 4, 2024

(30) Foreign Application Priority Data
Apr. 28, 2021   (CN) .......................... 202110466312.1

(51) Int. Cl.
*H04W 76/20*     (2018.01)
*H04W 72/0453*   (2023.01)
(Continued)

(52) U.S. Cl.
CPC ... *H04W 72/1268* (2013.01); *H04W 72/0453* (2013.01); *H04W 72/51* (2023.01); *H04W 76/20* (2018.02)

(58) Field of Classification Search
CPC .............................. H04W 76/20; H04W 72/51
(Continued)

(56) References Cited

FOREIGN PATENT DOCUMENTS

| CN | 106160985 A | 11/2016 |
|---|---|---|
| CN | 111757477 A | 10/2020 |

(Continued)

OTHER PUBLICATIONS

International Search Report and Written Opinion issued on Mar. 1, 2022 in corresponding Application No. PCT/CN2021/136748; 15 pages.

(Continued)

*Primary Examiner* — Angel T Brockman
(74) *Attorney, Agent, or Firm* — Andrew M. Calderon; Calderon Safran & Wright, PC

(57) ABSTRACT

The present disclosure provides a terminal capability reporting method, a user terminal, and a communication system. The terminal capability reporting method includes: reporting User Equipment (UE) capability information to a base station, wherein the UE capability information comprises band pairs in a band combination supporting uplink transmitter (Tx) switching, and a switching time for each of the band pairs, wherein the each of the band pairs comprises a first frequency band and a second frequency band each comprising one or two carriers.

12 Claims, 2 Drawing Sheets

(51) Int. Cl.
*H04W 72/1268* (2023.01)
*H04W 72/51* (2023.01)

(58) Field of Classification Search
USPC .......................................................... 370/329
See application file for complete search history.

(56) References Cited

FOREIGN PATENT DOCUMENTS

| CN | 112469032 A | 3/2021 |
|----|-------------|--------|
| EP | 3565290 A1  | 11/2019 |

OTHER PUBLICATIONS

China Telecom et al., "UE capability of supporting UL Tx switching", 3GPP TSG-RAN2 Meeting #110-e R2-2006177, Online, Jun. 1, 2020-Jun. 12, 2020, pp. 1-9; 11 pages.

Huawei et al., "Views on the DL interruptions due to UE switching between 1Tx carrier and 2Tx carrier", 3GPP TSG-RAN2 Meeting #110-e R2-2006177, Online, Apr. 20-30, 2020; pp. 1-3 ; 3 pages.

China Telecom, "RF issues for Tx switching between two uplink carriers", 3GPP TSG-RAN2 Meeting #110-e R2-2006177, Electronic meeting, Apr. 20-30, 2020 (Apr. 8, 2020), pp. 1-3; 3 pages.

Notification to Grant Patent issued on Jan. 9, 2024 in corresponding Chinese Patent Application No. 202110466312.1; 4 pages.

First Office Action issued on Jul. 12, 2023 in corresponding Chinese Patent Application No. 202110466312.1; 29 pages.

Second Office Action issued on Sep. 6, 2023 in corresponding Chinese Patent Application No. 202110466312.1; 37 pages.

Third Office Action issued on Oct. 27, 2023 in corresponding Chinese Patent Application No. 202110466312.1; 12 pages.

International Search Report and Written Opinion issued on Feb. 9, 2022 in corresponding Application No. PCT/CN2021/136748; 10 pages.

China Telecom et al., "UE capability of supporting UL Tx switching", 3GPP TSG-RAN2 Meeting #110-e R2-2006177, Jun. 19, 2020 (Jun. 19, 2020), pp. 1-9.

Huawei et al., "Views on the DL interruptions due to UE switching between 1Tx carrier and 2Tx carrier", 3GPP TSG-RAN2 Meeting #110-e R2-2006177, Apr. 15, 2020 (Apr, 15, 2020), pp. 1-3.

China Telecom, "RF issues for Tx switching between two uplink carriers", 3GPP TSG-RAN2 Meeting #110-e R2-2006177, Apr. 8, 2020 (Apr. 8, 2020), pp. 1-3.

Japanese Office Action dated Jun. 21, 2024 in Japanese Application No. 2023-566716, with English Translation, 12 pages.

Unknown, "RAN2 impact to support R17 UL Tx switching enhancements", 3GPP TSG-RAN WG2 Meeting #113bis-e Online, Apr. 12-20, 2021, 7 pages.

Unknown, "Discussion on Rel-17 uplink Tx switching", 3GPP TSG RAN WG1 #104bis-e e-Meeting, Apr. 12-20, 2021, 11 pages.

TERMINAL CAPABILITY REPORTING METHOD, USER TERMINAL AND COMMUNICATION SYSTEM

CROSS-REFERENCE TO RELATED APPLICATIONS

The present disclosure is a U.S. National Stage Application under 35 U.S.C. § 371 of International Patent Application No. PCT/CN2021/136748, filed on Dec. 9, 2021, which is based on and claims priority of Chinese application for invention No. 202110466312.1, filed on Apr. 28, 2021, the disclosures of both of which are hereby incorporated into this disclosure by reference in its entirety.

TECHNICAL FIELD

The present disclosure relates to the field of communication technologies, and in particular, to a terminal capability reporting method, a user terminal, and a communication system.

BACKGROUND

The Uplink Tx Switching technology in 3GPP (Third Generation Partnership Project) R16 (Release 16) is applicable for transmitter switching between two carriers. One of these two carriers is used for an uplink transmission with one antenna, and the other carrier is used for an uplink transmission with two antennas.

At present, in a co-construction and sharing project between different operators, there is 200-300 MHz frequency spectrum in the 3.5 GHz band, i.e., two component carriers, and one component carrier in another FDD (Frequency Division Duplex) frequency band (such as, the 2.1 GHz or 1.8 GHz band). A dual-carrier frequency band (such as, 3.5 GHz) has a capability of uplink 2Tx, while a single carrier frequency band (such as 2.1/1.8 GHz) has a capability of uplink 1Tx or uplink 2Tx.

SUMMARY

According to a first aspect of the embodiments of the present disclosure, there is provided a terminal capability reporting method, which is executed by a user terminal and comprises: reporting User Equipment (UE) capability information to a base station, wherein the UE capability information comprises band pairs in a band combination supporting uplink transmitter (Tx) switching, and a switching time for each of the band pairs, wherein the each of the band pairs comprises a first frequency band and a second frequency band each comprising one or two carriers.

In some embodiments, the UE capability information further comprises: a number of carriers within each frequency band of the each of the band pairs and a feature set of each of the carriers.

In some embodiments, the UE capability information further comprises: indication information about whether a downlink interruption occurs on a frequency band in the band combination during uplink Tx switching on the each of the band pairs.

In some embodiments, an uplink 1Tx transmission is supported on the first frequency band, and an uplink 2Tx transmission is supported on the second frequency band.

In some embodiments, the UE capability information further comprises: a first switching option supported by the band combination in case of switching for carrier aggregation, wherein the first switching option comprises one of 2Tx is used for an uplink transmission on the first frequency band, or both of 2Tx is used for an uplink transmission on the second frequency band.

In some embodiments, the UE capability information further comprises: a second switching option supported by the band combination in case of switching for carrier aggregation, wherein the second switching option comprises one of 2Tx is used for an uplink transmission on the first frequency band and the other one of the 2Tx is used for an uplink transmission on the second frequency band, or both of 2Tx is used for an uplink transmission on the second frequency band.

In some embodiments, an uplink 2Tx transmission is supported on both the first frequency band and the second frequency band.

In some embodiments, the UE capability information further comprises: a third switching option supported by the band combination in case of switching for carrier aggregation, wherein the third switching option comprises both of 2Tx is used for an uplink transmission on the first frequency band or the second frequency band.

In some embodiments, the UE capability information further comprises: a fourth switching option supported by the band combinations in case of switching for carrier aggregation, wherein the fourth switching option comprises both of 2Tx is used for an uplink transmission on the first frequency band or the second frequency band, or one of 2Tx is used for an uplink transmission on the first frequency band and the other one of the 2Tx is used for an uplink transmission on the second frequency band.

In some embodiments, the switching time is 35 μs, 140 μs, or 210 μs.

According to a second aspect of the embodiments of the present disclosure, there is provided a user terminal, comprising: a processor; a memory coupled to the processor for storing instructions, which when executed by the processor, cause the processor to execute the terminal capability reporting method according to any one of foregoing embodiments.

According to a third aspect of the embodiments of the present disclosure, there is provided a communication system, comprising: a user terminal according to any one of the above embodiments; and a base station used for send a radio resource control (RRC) message to the user terminal based on the terminal capability information reported by the user terminal, wherein the RRC message comprises configuration information on whether a Tx switching period is configured in one or more specific carriers.

In some embodiments, the Tx switching period is set to a same configuration for carriers on a same frequency band.

In some embodiments, for the first frequency band and the second frequency band comprised in the each of the band pairs, if the Tx switching period configured on one or more specific carriers on the first frequency band is true, the Tx switching period configured on one or more specific carriers on the second frequency band is false or if the Tx switching period configured on one or more specific carriers on the first frequency band is false, the Tx switching period configured on one or more specific carriers in the second frequency band is true.

In some embodiments, in case of switching for carrier aggregation, if the user terminal operates in a multi-carrier Tx switching mode, the RRC message further comprises configuration information for configuring the user terminal with a first switching option or a second switching option.

In some embodiments, for each band pair, in a case where an uplink 1Tx transmission is supported on the first frequency band of the band pair, and an uplink 2Tx transmission is supported on the second frequency band of the band pair, the RRC message further comprises configuration information for a first carrier on the first frequency band, and configuration information for a second carrier on the second frequency band and configuration information for a third carrier on the second frequency band, wherein the uplink 1Tx transmission is used on the first carrier, and the uplink 2Tx transmission is used on the second carrier and the third carrier.

In some embodiments, for each band pair, in a case where an uplink 2Tx transmission is supported on both the first frequency band and the second frequency band of the band pair, the RRC message does not comprise configuration information for a first carrier on the first frequency band, configuration information for a second carrier on the second frequency band or configuration information for a third carrier on the second frequency band.

According to a further aspect of the embodiments of the present disclosure, there is provided a non-transitory computer-readable storage medium storing computer instructions that, when executed by a processor, implement the terminal capability reporting method of any one of the above embodiments.

Other features and advantages of the present invention will become apparent from the following detailed description of exemplary embodiments of the present disclosure with reference to the accompanying drawings.

BRIEF DESCRIPTION OF THE DRAWINGS

The accompanying drawings, which are comprised to provide a further understanding of the present disclosure and are incorporated in and constitute a part of this specification, illustrate embodiments of the invention, and together with the illustrative embodiments of the present application serve to explain the present disclosure, but are not limitation thereof.

DETAILED DESCRIPTION

Various exemplary embodiments of the present disclosure will now be described in detail with reference to the accompanying drawings. The following description of the exemplary embodiments is in fact merely illustrative and is in no way intended as a limitation to the present disclosure, its application or use. The present disclosure may be implemented in many different forms, not limited to the embodiments described herein. These embodiments are provided so that this disclosure will be thorough and complete, and will fully convey the scope of the disclosure to those skilled in the art. Notice that, unless specifically stated otherwise, relative arrangement of components and steps, material composition, numerical expressions, and numerical values set forth in these embodiments are to be construed as merely illustrative, and not as a limitation.

A word such as "include" or "comprise" used in the present disclosure means that the element before the word covers the elements listed after the word, without excluding the possibility of also covering other elements.

Unless otherwise defined, all terms (comprising technical and scientific terms) used herein have the same meaning as commonly understood by one of ordinary skill in the art to which exemplary embodiments in accordance with principles of inventive concepts belong. It will also be understood that terms defined in such general-purpose dictionaries should be interpreted as having a meaning that is consistent with their meaning in the context of the relevant art, and not to be interpreted in an idealized or overly formal sense, unless explicitly defined herein.

Techniques, methods, and apparatus known to those of ordinary skill in the relevant art may not be discussed in detail, but where appropriate, these techniques, methods, and apparatuses should be considered as part of the specification.

The inventors have found through research that a Tx switching scheme currently used in the uplink Tx switching technology in 3GPP R16 is only applicable for a Tx switching between carriers within a single frequency band, and is not applicable for a Tx switching across frequency bands, which cannot effectively improve an utilization of an uplink bandwidth.

In view of this, this disclosure provides a terminal capability reporting scheme that can effectively improve the utilization of the uplink bandwidth.

Figure 1:
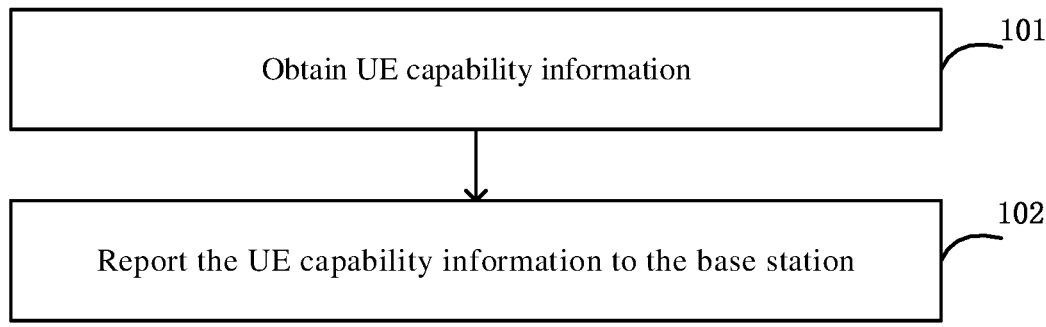
FIG. 1 is a flowchart of a terminal capability reporting method according to some embodiments of the present disclosure.

FIG. 1 is a flowchart of a terminal capability reporting method according to some embodiments of the present disclosure. In some embodiments, the steps of the following terminal capability reporting method are executed by a user terminal.

In step 101, User Equipment (UE) capability information is obtained.

In some embodiments, the UE capability information comprises various band pairs in a band combination supporting uplink Tx switching, and a switching time for each of the band pairs. The each of the band pairs comprises a first frequency band and a second frequency band each comprising one or two carriers. For example, the first frequency band comprises one carrier used for an uplink 1Tx transmission or an uplink 2Tx transmission, and the second frequency band comprises two carriers used for an uplink 2Tx transmission.

In some embodiments, the switching time of the each of the band pairs is 35 μs, 140 μs, or 210 μs. The switching time of the each of the band pairs indicates a time required for a Tx switching from one frequency band to another frequency band in the each of the band pairs. By setting different switching times, the switching times can be the same or different for different numbers of carriers, providing flexibility in implementation.

In some embodiments, the UE capability information further comprises: a number of carriers within each frequency band of the each of the band pairs (ca-BandwidthClassUL parameter) and a feature set of each of the carriers (per cc feature set).

Note that a user terminal supporting a Tx switching among N (N≥3) carriers supports a Tx switching among N−1 carriers.

In some embodiments, the UE capability information further comprises: indication information about whether a downlink interruption on a frequency band in the band combination is caused by an uplink Tx switching on the each of the band pairs. The indication information comprises: for the each of the band pairs, whether the downlink interruption is required on each of the frequency bands in the band combination.

For example, in case of CA (Carrier Aggregation) of FDD+TDD (Time Division Duplex), for each band pair on which a Tx switching is performed, it is reported whether a downlink interruption is caused on one or more frequency bands in a band combination that containing the band pair.

It should be noted that for a frequency band, if the user terminal does not report the above indication information, it is assumed that a downlink transmission on the frequency band does not need to be interrupted.

In some embodiments, an uplink 1Tx transmission is supported on the first frequency band, and an uplink 2Tx transmission is supported on the second frequency band, which corresponds to a 1Tx-2Tx scenario.

In the 1Tx-2Tx scenario, the UE capability information further comprises: a first switching option supported by the band combination in case of switching for carrier aggregation.

For example, the first switching option is shown in Table 1.

TABLE 1

| Case 1: | 1T + 0T |
| Case 2: | 0T + 2T |

As shown in Table 1, in Case 1, one of 2Tx is used for an uplink transmission on the first frequency band. In Case 2, both of 2Tx is used for an uplink transmission on the second frequency band.

In the 1Tx-2Tx scenario, the UE capability information further comprises: a second switching option supported by the band combination in case of switching for carrier aggregation.

For example, the second switching option is shown in Table 2.

TABLE 2

| Case 1: | 1T + 1T |
| Case 2: | 0T + 2T |

As shown in Table 2, in Case 1, one of 2Tx is used for an uplink transmission on the first frequency band and the other one of the 2Tx is used for an uplink transmission on the second frequency band. In Case 2, both of the 2Tx are used for an uplink transmission on the second frequency band.

It should be noted that the power boosting in the existing technology is only applicable to the 1Tx-2Tx scenario.

In some embodiments, an uplink 2Tx transmission is supported on both the first frequency band and the second frequency band, which corresponds to a 2Tx-2Tx scenario.

In the 2Tx-2Tx scenario, the UE capability information further comprises: a third switching option supported by the band combination in case of switching for carrier aggregation.

For example, the third switching option is shown in Table 3.

TABLE 3

| Case 1: | 0T + 2T |
| Case 2: | 2T + 0T |

As shown in Table 3, in Case 1, both of 2Tx is used for an uplink transmission on the second frequency band. In Case 2, both of 2Tx are used for an uplink transmission the first frequency band.

In some embodiments, in the 2Tx-2Tx scenario, the UE capability information further comprises: a fourth switching option supported by the band combinations in case of switching for carrier aggregation.

For example, the fourth switching option is shown in Table 4.

TABLE 4

| Case 1: | 1T + 1T |
| Case 2: | 0T + 2T |
| Case 3: | 2T + 0T |

As shown in Table 4, in Case 1, one of the 2Tx is used for an uplink transmission on the first frequency band, and the other one of 2Tx is used for an uplink transmission on the second frequency band. In Case 2, both of 2Tx are used for an uplink transmission on the second frequency band. In Case 3, both of the 2Tx are used for an uplink transmission on the first frequency band.

In some embodiments, for a user terminal that support all the above options, power classes of switching frequency bands and band combinations may be different. For example, a newly reported power class can be used for options 1 and 2, while an original power class can be used for option 3.

In some embodiments, the UE capability information is processed using a UE capability filter.

In step 102, the UE capability information is reported to a base station.

In the UE 1 capability reporting method provided in the above embodiments of this disclosure, by reporting the each of the band pairs supporting uplink Tx switching in the band combination, and the switching time for the each of the band pairs to the base station, the base station can configure a user terminal to switch between the frequency bands based on the received UE capability information, thereby effectively improving an utilization of an uplink bandwidth.

Figure 2:
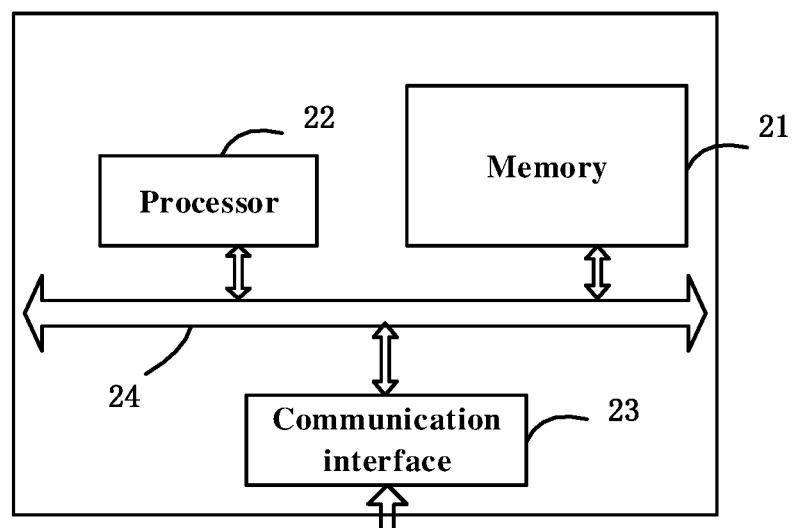
FIG. 2 is a schematic structural diagram of a user terminal according to some embodiments of the present disclosure.
Figure 3:
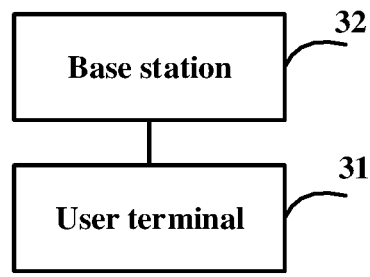
FIG. 3 is a schematic structural diagram of a communication system according to some embodiments of the present disclosure.

FIG. 2 is a schematic structural diagram of a user terminal according to some embodiments of the present disclosure. As shown in FIG. 3, the user terminal comprises a memory 21 and a processor 22.

The memory 21 is used for storing instructions. The processor 22 is coupled to the memory 21. The processor 22 is configured to, based on instructions stored in the memory, carry out a method to implement the embodiment shown in FIG. 1.

As shown in FIG. 2, the user terminal also comprises a communication interface 23 for information interaction with other devices. In addition, the user terminal further comprises a bus 24. The processor 22, the communication interface 23, and the memory 21 perform communication with each other through the bus 24.

The memory 21 may comprise high-speed RAM (Random Access Memory) or NVM (Non-Volatile Memory). For example, it may be at least one disk storage. The memory 21 may also be a memory array. The memory 21 may also be partitioned into blocks, which may be combined into virtual volumes according to a certain rule.

In addition, the processor 22 may be a central processing unit (CPU), or may be an Application Specific Integrated Circuit (ASIC) or one or more integrated circuits configured to implement the embodiments of the present disclosure.

The present disclosure further provides a non-transitory computer-readable medium stored thereon computer instructions that, when executed by a processor, implement a method involved in the embodiments of FIG. 1.

FIG. 3 is a schematic structural diagram of a communication system according to some embodiments of the present disclosure. As shown in FIG. 3, the communication system comprises a user terminal 31 and a base station 32. The user terminal 31 is a user terminal involved in any embodiment of FIG. 2.

The base station 32 is configured to send a RRC (Radio Resource Control) message to the user terminal based on the UE capability information reported by the user terminal, wherein the RRC message comprises configuration information on whether a Tx switching period is configured in one or more specific carriers.

In some embodiments, the Tx switching period is set to a same configuration for carriers on a same frequency band.

In some embodiments, for the first frequency band and the second frequency band comprised in the each of the band pairs, the Tx switching period is configured on one or more specific carriers in one of the first frequency band and the second frequency band.

For example, if the first frequency band is configured with TRUE, the second frequency band is configured with FALSE.

It should be noted that the user terminal cannot send uplink signals in a Tx switching period.

In some embodiments, in case of switching for carrier aggregation, if the user terminal operates in a multi-carrier Tx switching mode, the RRC message further comprises configuration information for configuring the user terminal with a first switching option or a second switching option.

In some embodiments, for each band pair, in a case where an uplink 1Tx transmission is supported on the first frequency band of the band pair, and an uplink 2Tx transmission is supported on the second frequency band of the band pair, the RRC message further comprises configuration information for a first carrier on the first frequency band, and configuration information for a second carrier on the second frequency band and configuration information for a third carrier on the second frequency band, wherein the uplink 1Tx transmission is used on the first carrier, and the uplink 2Tx transmission is used on the second carrier and the third carrier.

For example, in a band pair, one carrier on a first frequency band used for an uplink 1Tx transmission is configured as a first carrier, and two carriers on a second frequency band used for an uplink 2Tx transmission are configured as a second carrier and a third carrier.

In some embodiments, for each band pair, in a case where an uplink 2Tx transmission is supported on both the first frequency band and the second frequency band of the band pair, the RRC message does not comprise configuration information for a first carrier on the first frequency band, configuration information for a second carrier on the second frequency band or configuration information for a third carrier on the second frequency band.

It should be noted that since an uplink 2Tx transmission can be used on all the carriers in the first frequency band and the second frequency band, there is no need to configure which carrier is used as the first carrier, which carrier is used as the second carrier, and which carrier is used as the third carrier.

In some embodiments, the above functional modules can be implemented as a general-purpose processor, a Programmable logic controller (PLC), a digital signal processor (DSP), an application specific integrated circuit (ASIC), a field programmable gate array (FPGA) or other programmable logic devices, discrete gates or transistor logic devices, discrete hardware components or any appropriate combination thereof for performing the functions described in this application.

Those skilled in the art should understand that the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (comprising but not limited to disk storage, CD-ROM, optical storage device, etc.) having computer-usable program code embodied therein.

The present disclosure is described with reference to flowcharts and/or block diagrams of methods, apparatuses (systems) and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing device to generate a machine such that the instructions executed by a processor of a computer or other programmable data processing device to generate means implementing the functions specified in one or more flows of the flowcharts and/or one or more blocks of the block diagrams.

The computer program instructions may also be stored in a computer readable storage device capable of directing a computer or other programmable data processing apparatus to operate in a specific manner such that the instructions stored in the computer readable storage device produce an article of manufacture comprising instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams. The above is merely preferred embodiments of this disclosure, and is not limitation to this disclosure. Within spirit and principles of this disclosure, any modification, replacement, improvement and etc. shall be contained in the protection scope of this disclosure.

What is claimed is:

1. A terminal capability reporting method executed by a user terminal, comprising:
reporting User Equipment (UE) capability information to a base station, wherein the UE capability information comprises band pairs in a band combination supporting uplink transmitter (Tx) switching, and a switching time for each of the band pairs, wherein the each of the band pairs comprises a first frequency band and a second frequency band each comprising one or two carriers and the an uplink 2Tx transmission is supported on both the first frequency band and the second frequency band, and the UE capability information further comprises: a number of carriers within each frequency band of the each of the band pairs and a feature set of each of the carriers, wherein an uplink 2Tx transmission is supported on both the first frequency band and the second frequency band, the UE capability information further comprises: a first switching option supported by the band combination in case of switching for carrier aggregation, and/or a second switching option supported by the band combinations in case of switching for carrier aggregation, wherein the first switching option comprises both of 2Tx is used for an uplink transmission on the first frequency band or the second frequency band, and the second switching option comprises both of 2Tx is used for an uplink transmission on the first frequency band or the second frequency band, or one of 2Tx is used for an uplink transmission on the first frequency band and the other one of the 2Tx is used for an uplink transmission on the second frequency band; and receiving a radio resource control (RRC) message sent from the base station, wherein the RRC message comprises configuration information on whether a Tx switching period is configured in one or more specific carriers, the Tx switching period is set to a same configuration for carriers on a same frequency band and for the first frequency band and the second frequency band comprised in the each of the band pairs, if the Tx switching period configured on one or more specific carriers on the first frequency band is true, the Tx switching period configured on one or more specific carriers on the second frequency band is false or if the Tx switching period configured on one or more specific carriers on the first frequency band is false, the Tx switching period configured on one or more specific carriers in the second frequency band is true.

2. The terminal capability reporting method according to claim 1, wherein the UE capability information further comprises: indication information about whether a downlink interruption occurs on a frequency band in the band combination during uplink Tx switching on the each of the band pairs.

3. The terminal capability reporting method according to claim 1, wherein the switching time is 35 µs, 140 µs, or 210 µs.

4. A user terminal, comprising:
a processor; and
a memory coupled to the processor for storing instructions that, when executed by the processor, cause the processor to:
report User Equipment (UE) capability information to a base station, wherein the UE capability information comprises band pairs in a band combination supporting uplink transmitter (Tx) switching, and a switching time for each of the band pairs, wherein the each of the band pairs comprises a first frequency band and a second frequency band each comprising one or two carriers and the an uplink 2Tx transmission is supported on both the first frequency band and the second frequency band, and the UE capability information further comprises: a number of carriers within each frequency band of the each of the band pairs and a feature set of each of the carriers, wherein an uplink 2Tx transmission is supported on both the first frequency band and the second frequency band, the UE capability information further comprises: a first switching option supported by the band combination in case of switching for carrier aggregation, and/or a second switching option supported by the band combinations in case of switching for carrier aggregation, wherein the first switching option comprises both of 2Tx is used for an uplink transmission on the first frequency band or the second frequency band, and the second switching option comprises both of 2Tx is used for an uplink transmission on the first frequency band or the second frequency band, or one of 2Tx is used for an uplink transmission on the first frequency band and the other one of the 2Tx is used for an uplink transmission on the second frequency band; and receive a radio resource control (RRC) message sent from the base station, wherein the RRC message comprises configuration information on whether a Tx switching period is configured in one or more specific carriers, the Tx switching period is set to a same configuration for carriers on a same frequency band and for the first frequency band and the second frequency band comprised in the each of the band pairs, if the Tx switching period configured on one or more specific carriers on the first frequency band is true, the Tx switching period configured on one or more specific carriers on the second frequency band is false or if the Tx switching period configured on one or more specific carriers on the first frequency band is false, the Tx switching period configured on one or more specific carriers in the second frequency band is true.

5. A communication system, comprising:
a user terminal according to claim 4; and
a base station used for sending a radio resource control (RRC) message to the user terminal based on the terminal capability information reported by the user terminal, wherein the RRC message comprises configuration information on whether a Tx switching period is configured in one or more specific carriers, the Tx switching period is set to a same configuration for carriers on a same frequency band and for the first frequency band and the second frequency band comprised in the each of the band pairs, if the Tx switching period configured on one or more specific carriers on the first frequency band is true, the Tx switching period configured on one or more specific carriers on the second frequency band is false or if the Tx switching period configured on one or more specific carriers on the first frequency band is false, the Tx switching period configured on one or more specific carriers in the second frequency band is true.

6. The system according to claim 5, wherein in case of switching for carrier aggregation, if the user terminal operates in a multi-carrier Tx switching mode, the RRC message further comprises configuration information for configuring the user terminal with a first switching option or a second switching option.

7. The system according to claim 5, wherein for each band pair, in a case where an uplink 2Tx transmission is supported on both the first frequency band and the second frequency band of the band pair, the RRC message does not comprise configuration information for a first carrier on the first frequency band, configuration information for a second carrier on the second frequency band or configuration information for a third carrier on the second frequency band.

8. A non-transitory computer readable storage medium stored thereon computer instructions that, when executed by a processor, cause the processor to:

report User Equipment (UE) capability information to a base station, wherein the UE capability information comprises band pairs in a band combination supporting uplink transmitter (Tx) switching, and a switching time for each of the band pairs, wherein the each of the band pairs comprises a first frequency band and a second frequency band each comprising one or two carriers and the an uplink 2Tx transmission is supported on both the first frequency band and the second frequency band, and the UE capability information further comprises: a number of carriers within each frequency band of the each of the band pairs and a feature set of each of the carriers, wherein an uplink 2Tx transmission is supported on both the first frequency band and the second frequency band, the UE capability information further comprises: a first switching option supported by the band combination in case of switching for carrier aggregation, and/or a second switching option supported by the band combinations in case of switching for carrier aggregation, wherein the first switching option comprises both of 2Tx is used for an uplink transmission on the first frequency band or the second frequency band, and the second switching option comprises both of 2Tx is used for an uplink transmission on the first frequency band or the second frequency band, or one of 2Tx is used for an uplink transmission on the first frequency band and the other one of the 2Tx is used for an uplink transmission on the second frequency band; and receive a radio resource control (RRC) message sent from the base station, wherein the RRC message comprises configuration information on whether a Tx switching period is configured in one or more specific carriers, the Tx switching period is set to a same configuration for carriers on a same frequency band and for the first frequency band and the second frequency band comprised in the each of the band pairs, if the Tx switching period configured on one or more specific carriers on the first frequency band is true, the Tx switching period configured on one or more specific carriers on the second frequency band is false or if the Tx switching period configured on one or more specific carriers on the first frequency band is false, the Tx switching period configured on one or more specific carriers in the second frequency band is true.

9. The user terminal according to claim 4, wherein the UE capability information further comprises: indication information about whether a downlink interruption occurs on a frequency band in the band combination during uplink Tx switching on the each of the band pairs.

10. The user terminal according to claim 4, wherein the switching time is 35 µs, 140 µs, or 210 µs.

11. The non-transitory computer readable storage medium according to claim 8, wherein the UE capability information further comprises: indication information about whether a downlink interruption occurs on a frequency band in the band combination during uplink Tx switching on the each of the band pairs.

12. The non-transitory computer readable storage medium according to claim 8, wherein the switching time is 35 µs, 140 µs, or 210 µs.

* * * * *